(12) United States Patent
Krueger et al.

(10) Patent No.: US 11,385,091 B2
(45) Date of Patent: *Jul. 12, 2022

(54) SYSTEM, METHOD AND APPARATUS FOR LADING MEASUREMENT IN A RAIL CAR

(71) Applicant: BNSF Railway Company, Fort Worth, TX (US)

(72) Inventors: Darrell Robert Krueger, Lawrence, KS (US); Corey D. Wills, Berryton, KS (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/304,825

(22) Filed: Jun. 25, 2021

(65) Prior Publication Data

US 2021/0318157 A1 Oct. 14, 2021

Related U.S. Application Data

(62) Division of application No. 15/720,420, filed on Sep. 29, 2017, now Pat. No. 11,099,048.

(Continued)

(51) Int. Cl.
*G01F 23/20* (2006.01)
*G01F 25/20* (2022.01)
(Continued)

(52) U.S. Cl.
CPC ............ *G01F 23/205* (2013.01); *G01F 23/20* (2013.01); *G01F 25/20* (2022.01); *G01N 3/08* (2013.01);
(Continued)

(58) Field of Classification Search
CPC .... G01F 23/205; G01F 25/0061; G01F 23/20; G01F 23/0007; G01N 3/08; G01N 27/9053; G01M 17/10
See application file for complete search history.

(56) References Cited

U.S. PATENT DOCUMENTS 6,006,597 A 12/1999 Miyazaki
6,408,766 B1 6/2002 McLaughlin et al.
(Continued)

FOREIGN PATENT DOCUMENTS

| CA | 2838145 C | 2/2016 |
|---|---|---|
| RU | 134861 U1 | 11/2013 |
| WO | 2012047296 A1 | 4/2012 |

*Primary Examiner* — Peter J Macchiarolo
*Assistant Examiner* — John M Royston
(74) *Attorney, Agent, or Firm* — Enrique Sanchez, Jr.; Whitaker Chalk Swindle & Schwartz, PLLC

(57) ABSTRACT

A rail vehicle includes a truck having wheels for engaging a railroad track, a bolster supported by the truck, and a tank supported by the bolster for storing a lading. A measurement system measures the level of the lading within the tank and includes gauges and a controller. The gauges are disposed at selected points on the bolster for sensing at least one of lateral and longitudinal localized displacement experienced by the bolster during motion of the rail vehicle. The controller calculates the level of the lading within the tank and compensates for changes in the level of the lading during motion of the rail vehicle in response to signals generated by the gauges.

19 Claims, 16 Drawing Sheets

Related U.S. Application Data

(60) Provisional application No. 62/403,242, filed on Oct. 3, 2016.

(51) Int. Cl.
  *G01N 3/08* (2006.01)
  *G01N 27/90* (2021.01)
  *G01F 23/00* (2022.01)
  *G01M 17/10* (2006.01)

(52) U.S. Cl.
  CPC ..... *G01N 27/9053* (2013.01); *G01F 23/0007* (2013.01); *G01M 17/10* (2013.01)

(56) References Cited

U.S. PATENT DOCUMENTS

| | | | |
|---|---|---|---|
| 6,787,713 B2 | 9/2004 | Kuechenmeister et al. | |
| 7,129,425 B2 | 10/2006 | Carr et al. | |
| 8,227,713 B1 | 7/2012 | Slifkin et al. | |
| 8,950,267 B2 * | 2/2015 | Doble | G01N 3/40 73/788 |
| 8,958,972 B1 | 2/2015 | Fisher | |
| 9,103,707 B2 | 8/2015 | Fisher | |
| 2004/0251058 A1 | 12/2004 | Carr et al. | |
| 2007/0152107 A1 | 7/2007 | LeFebvre et al. | |
| 2008/0304065 A1 | 12/2008 | Hesser et al. | |
| 2010/0200307 A1 | 8/2010 | Toms | |
| 2011/0257869 A1 | 10/2011 | Kumar et al. | |
| 2012/0085260 A1 | 4/2012 | Nichini et al. | |
| 2012/0090729 A1 | 4/2012 | Nichini et al. | |
| 2013/0132004 A1 | 5/2013 | Georgeson et al. | |
| 2013/0245864 A1 | 9/2013 | Frazier et al. | |
| 2014/0033948 A1 | 2/2014 | Foege | |
| 2014/0299101 A1 | 10/2014 | Melanson et al. | |
| 2014/0339022 A1 | 11/2014 | Bushen | |
| 2014/0353434 A1 | 12/2014 | Otsubo et al. | |
| 2014/0358336 A1 | 12/2014 | Otsubo et al. | |
| 2015/0143821 A1 | 5/2015 | Johnson et al. | |
| 2015/0149003 A1 | 5/2015 | Kupiec et al. | |
| 2015/0219487 A1 | 8/2015 | Maraini | |
| 2015/0367862 A1 | 12/2015 | Ledbetter et al. | |
| 2015/0377159 A1 | 12/2015 | Fisher | |
| 2018/0257679 A1 * | 9/2018 | Donnelly | B61F 1/14 |

* cited by examiner

SYSTEM, METHOD AND APPARATUS FOR LADING MEASUREMENT IN A RAIL CAR

The present application is a Divisional Application of U.S. patent application Ser. No. 15/720,420, filed on Sep. 29, 2017, which claims the benefit of U.S. Provisional Patent Application Ser. No. 62/403,242, filed Oct. 3, 2016, both of which are incorporated herein by reference in their entirety.

BACKGROUND OF THE INVENTION

Field of the Disclosure

The present invention relates in general to cargo or lading measurements and, in particular, to a system, method and apparatus for lading level measurement in a rail car.

Description of the Prior Art

There are many ways to measure cargo or lading levels in a rail car. For example, for a rail car fuel tank (such as a cryogenic tank), lading measurement techniques include hydrostatic methods, capacitance methods, lasers, radars and other means. One current method used in the railroad industry to measure the fluid level in liquid natural gas (LNG) fuel tender rail cars is by differential pressure measurements.

In a differential pressure measurement system, a sensor compares the vapor pressure at the top of the tank to the liquid pressure at the bottom of the tank. While this works well for stationary tanks, it does not work well for moving tanks, such as those on railroad tank cars and railroad fuel tenders. Among other things, field observations have shown that product sloshing and other factors may change a fluid level reading by 20% or more.

Additional factors that also may be considered in measuring cryogenic fluid levels within a moving tank include the cost of cryogenic-rated transducers, labor costs, the difficulty of vessel modifications, risks with flammable vapors, etc. Thus, improvements in cargo or lading level measurement in rail cars continue to be of interest.

SUMMARY

Embodiments of a system, method and apparatus for lading level measurement in a rail car are disclosed. For example, a railroad vehicle includes a truck having wheels configured to engage a railroad track. A bolster is supported by the truck and a vessel is supported by the bolster and configured to store a lading. A measurement system is included for measuring a level of the lading within the vessel. The measurement system has strain gauges mounted directly to the bolster and in physical, intimate contact with the bolster. The strain gauges are disposed at selected points on the bolster and configured to sense at least one of lateral and longitudinal strain experienced by the bolster during motion of the railroad vehicle and generate signals in response thereto. A controller is included for calculating the level of the lading within the vessel. The controller is configured to compensate for changes in the level of the lading during motion of the railroad vehicle in response to the signals generated by the strain gauges.

Another embodiment of a railroad vehicle has a pair of trucks, each having wheels configured to engage a railroad track and a bolster supported by a respective one of the trucks. A vessel is supported by the bolsters and configured to store a lading. A measurement system measures a level of the lading within the vessel. The measurement system has gauges mounted to both of the bolsters. The gauges are disposed at selected points on the bolster and configured to sense at least one of lateral and longitudinal localized displacement experienced by the bolsters during motion of the railroad vehicle and generate signals in response thereto.

An embodiment of a method of measuring a weight of a lading in a railroad vehicle includes providing a railroad vehicle having a pair of trucks, each truck having wheels engaging a railroad track and a bolster supported by a respective one of the trucks. The method further includes measuring a level of the lading within the vessel by sensing at least one of lateral and longitudinal localized displacement of both of the bolsters during motion of the railroad vehicle and generating signals in response thereto. In addition, the method calculates the level of the lading within the vessel by compensating for changes in the level of the lading during motion of the railroad vehicle.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

FIGS. 1-12 disclose embodiments of a system, method and apparatus for cargo or lading level measurement in a rail car. In some versions, the present disclosure describes the weighing of the lading of a rail car, no matter if the lading is a liquid, slurry, gel, aggregate, solid, or gas. With regard to LNG (or other liquids), the liquid level is an indirect measurement of the amount of product in a rail car. The embodiments disclosed herein can measure the weight of the lading so the user knows how much product they have (by weight). Examples of other applications include, for instance, a grain rail car and measuring the grain therein after tare-ing out the weight of the body of the rail car.

In general, gauges (such as strain gauges) may be used to turn objects (e.g., structures) into load cells. For example, some cranes, fork lifts, and bridges are strain gauged and calibrated to indicate load. When people move, their skin stretches, muscles change length, and bones experience tensile and compressive forces. Steel and other metals behave similarly, and stretch or change length in small amounts when a force is applied. Strain gauges are used to measure this small change in length. Other types of gauges that may be used with or in place of strain gauges include physical displacement gauges with technology such as: eddy current, capacitance, laser, confocal, inductive and magneto-inductive systems. Each of these gauges is capable of sensing or detecting localized displacement, such as the deflection of a structure under load.

Figure 1A:
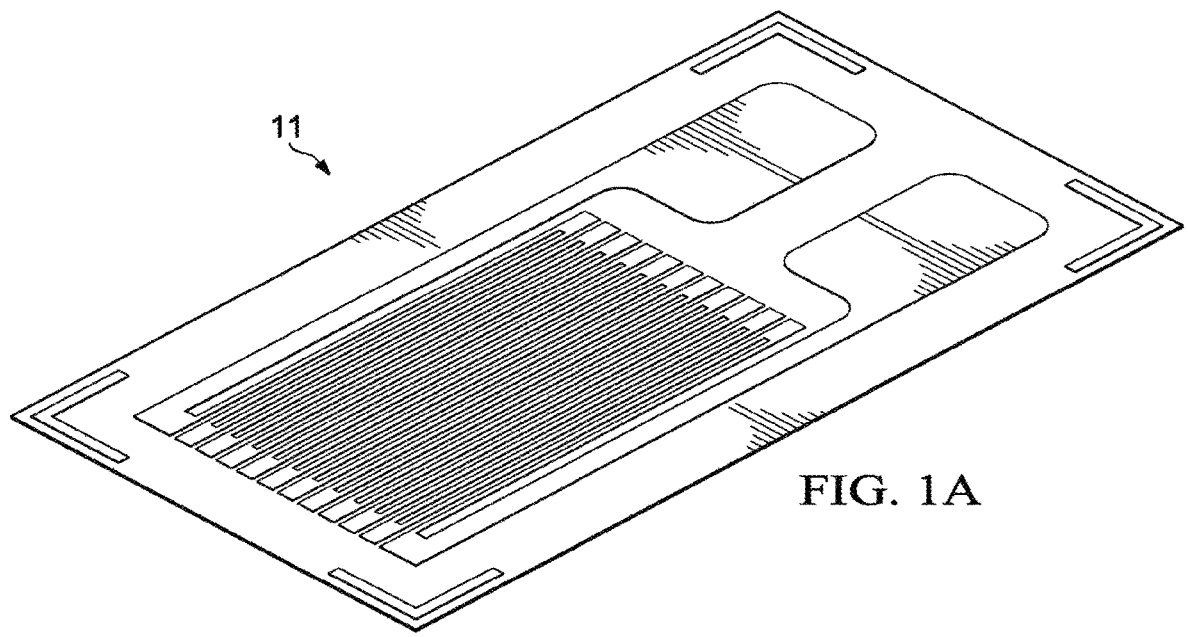
FIGS. 1A and 1B depict embodiments of strain gauges suitable for the various embodiments described herein.
Figure 1B:
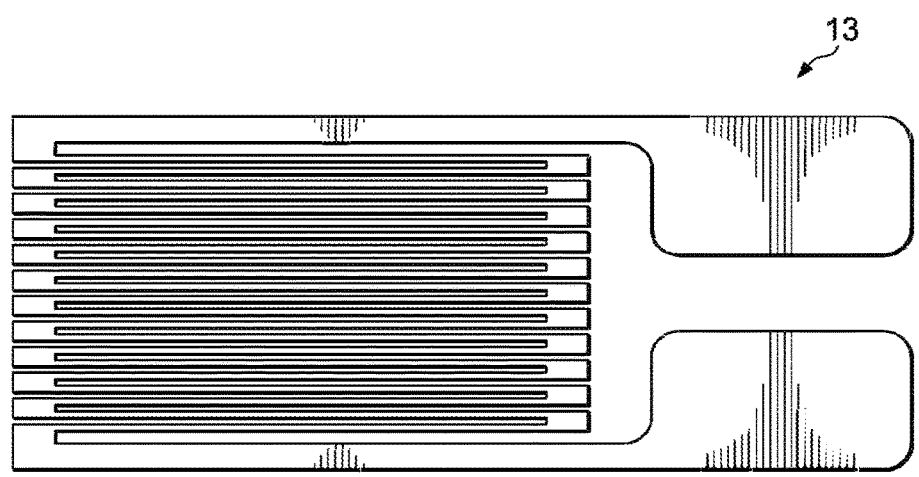
Figure 2:
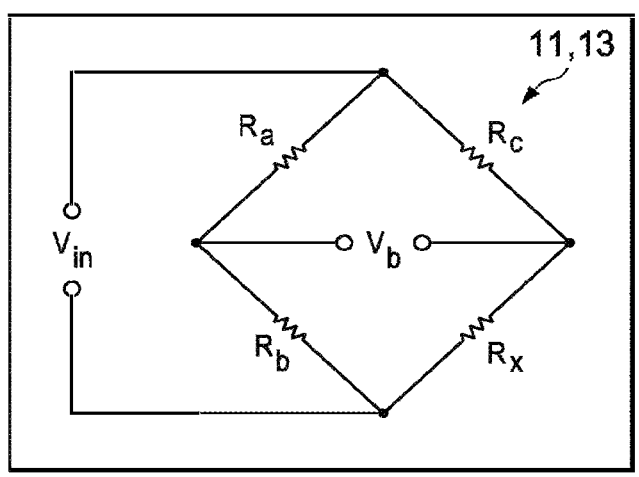
FIG. 2 depicts an embodiment of a Wheatstone bridge in which the strain gauges of FIGS. 1A and 1B may be arranged for performing strain measurements.

Examples of strain gauges 11, 13 are shown in FIGS. 1A and 1B, respectively. Each strain gauge 11, 13 comprises a thin wire on a piece of film that is bonded to the object being tested. When the object is strained, the very thin wire is stretched or compressed. This changes the length of the thin wire, and thus changes the electrical resistance. An electrical circuit or processing system can measure and record this change in electrical resistance.

Strain gauges are commonly arranged in groups of four in a Wheatstone bridge circuit 15 (FIG. 2) to improve performance compared to a single strain gauge. Signals from typical strain gauges are very small, commonly in the thousandths of volts, which require specialized equipment to read and record. In the Wheatstone bridge of FIG. 2, four strain gauges (such as strain gauges 11, 13) represent the resistances $R_a$, $R_b$, $R_c$, and R. The voltage Vi is a predetermined fixed applied voltage, and $v_b$ is the output voltage, which varies in response to variations in the resistance of the one or more of the strain gauges 11, 13.

Figure 3:
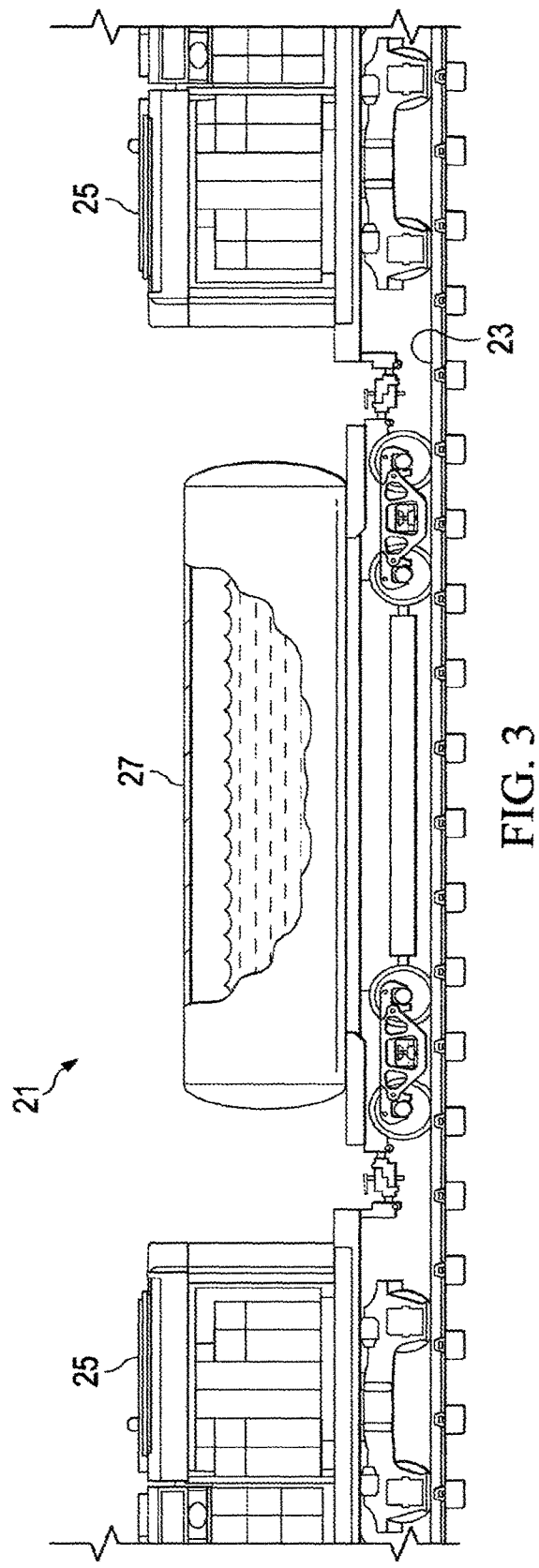
FIG. 3 is a high level diagram of an embodiment of a portion of a train including a LNG fuel tender in service of two locomotives that use LNG fuel.

Embodiments of a system, method and apparatus for lading level measurement using strain gauges in a railroad car are disclosed in FIGS. 3-8. For example, FIG. 3 is a diagram of a portion of a railroad train 21 on a railroad 23 including a pair of locomotives 25 (e.g., LNG-powered locomotives) serviced by a tender 27 having a vessel for liquid (e.g., a LNG fuel vessel), suitable for describing one application of this disclosure.

Figure 4:
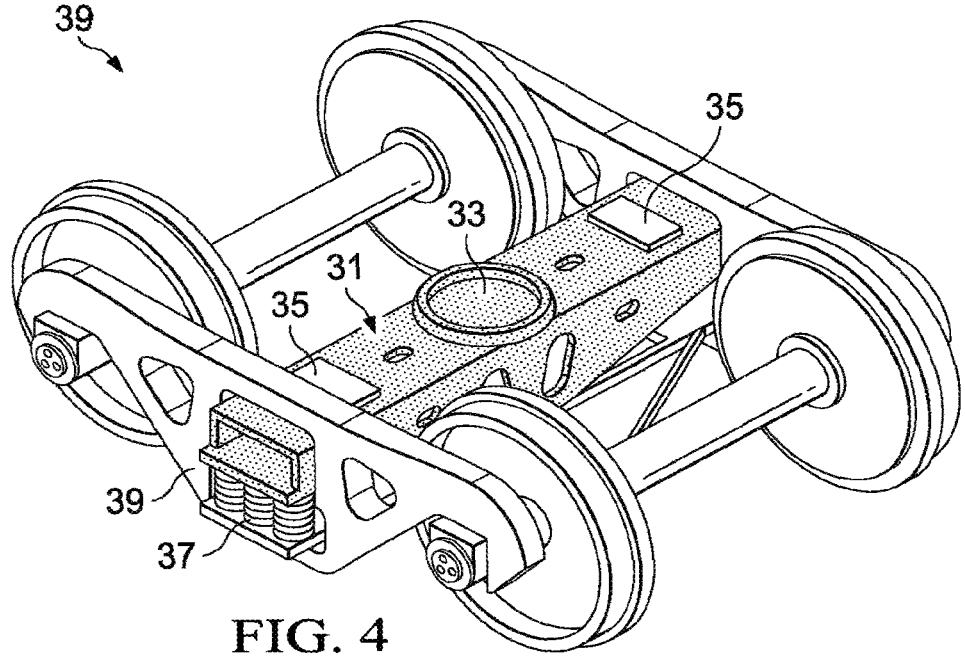
FIG. 4 is an isometric view of an embodiment of a truck for a rail car.

The load in the vessel of tender 27 and its contents is distributed laterally on a railroad track on a steel casting known as a bolster 31 (FIG. 4). The weight of the tender 27 and its contents is applied to the center bowl 33 of the bolster 31, with some of the weight thereof being supported by the side bearings 35 of the bolster 31. The center bowl 33 is a cylindrical volume cast into the bolster where the center plate engages the bolster. The center plate is a cylindrical casting fastened to the vessel of the tender 27 and it engages the center bowl 33. The center wear plate may refer to a sacrificial wear lining inserted into the center bowl 33. The center wear plate may be of metallic or plastic construction. The column wear plates are located on the side frames of a truck 39 of the tender 27. The column wear plates engage the bolster 31 at its lateral ends with friction wedges. The column wear plates are oriented fore and aft of springs 37 on the bolster 31. The springs 37 support the bolster 31 on outer portions thereof, such as at bolster spring seats of the bolster 31. Opposite ends of the springs 37 are mounted to the truck 39, which has wheels mounted on axles.

Figure 5:
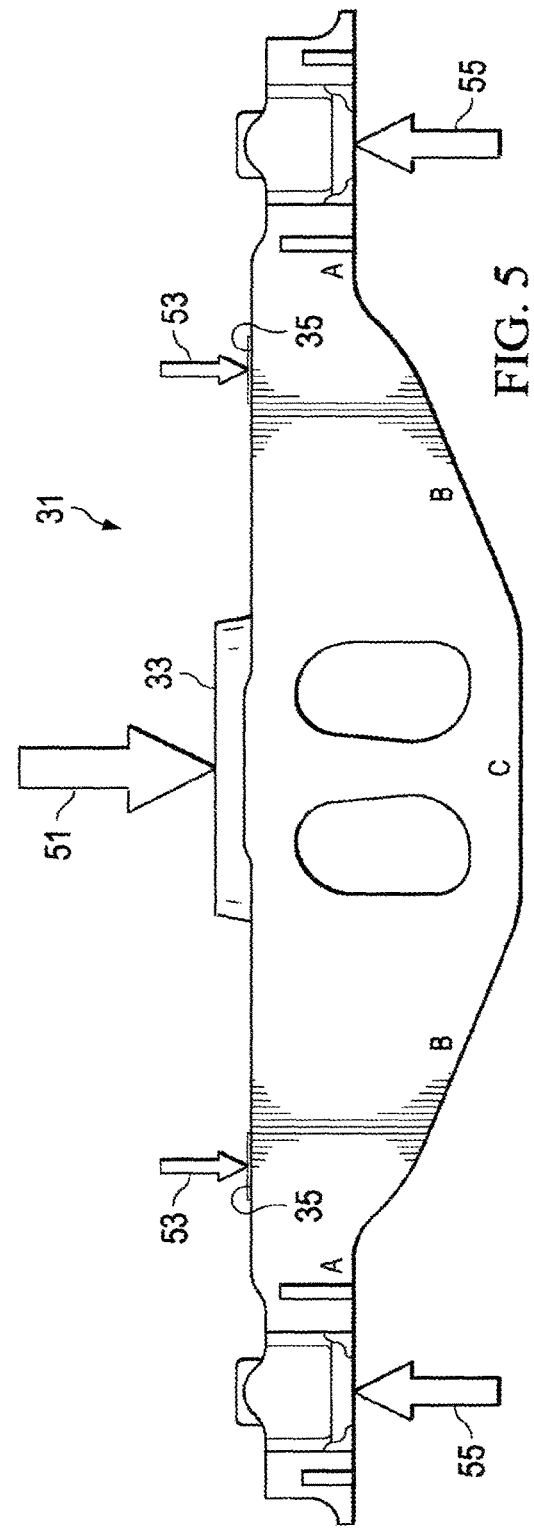
FIG. 5 is a front sectional view of an embodiment of a bolster of the truck of FIG. 4, depicting areas of strain on the bolster applied by a car body.

FIG. 5 depicts a front view of the bolster 31. Loads are represented by arrows, such as a load 51 applied by rail vehicle like a fuel tender or cryogenic tank car. Portions of loads 53 of the rail car are applied to the side bearings 35 as well. The bolster 31 is supported on the rail car's truck 39 via spring forces 55.

There are optional locations for the strain gauges according to embodiments disclosed herein. For example, during experimentation, large strains on the bolster 31 were found at position A between the bolster spring seat and the location where the side bearings are mounted. The strain gauges may be placed in areas of large strain to get the most electrical output signal possible. During some experiments, the strain gauges were placed in the areas labeled A in FIG. 5. There are some arrangements of strain gauges that also may compensate for temperature, grade, uneven track, and even the influence of train braking or lateral forces. Installation locations A also offer enhanced protection from foreign object damage when compared to locations B and C, although locations B and C may offer increased signal, at the cost of reduced protection.

FIGS. 6A-6E depict an example of one process of attaching the strain gauges 11, 13 to the bolster 31, although alternate processes may be used in practice. Examples of attaching the strain gauges include (1) metal foil with adhesive attached directly to the bolster 31; (2) metal foil with adhesive attached to a piece of intermediate shim stock, then spot welded to the bolster 31; and (3) fiber optic grating with spot welding to the bolster 31.

Figure 6A:
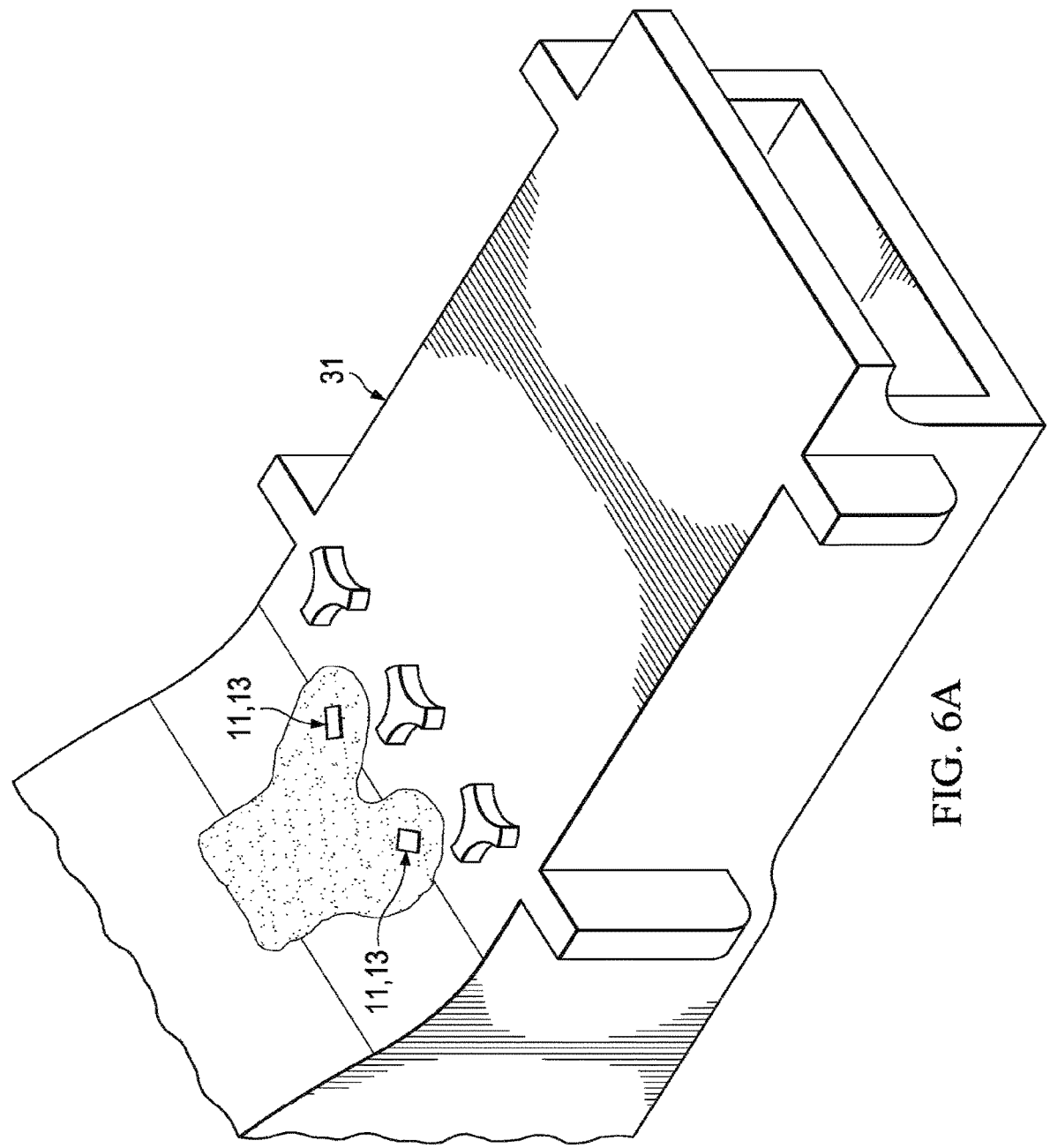
FIGS. 6A-6E depict embodiments of assembly and method steps for mounting the strain gauges to the bolster, and subsequent testing thereof.
Figure 6B:
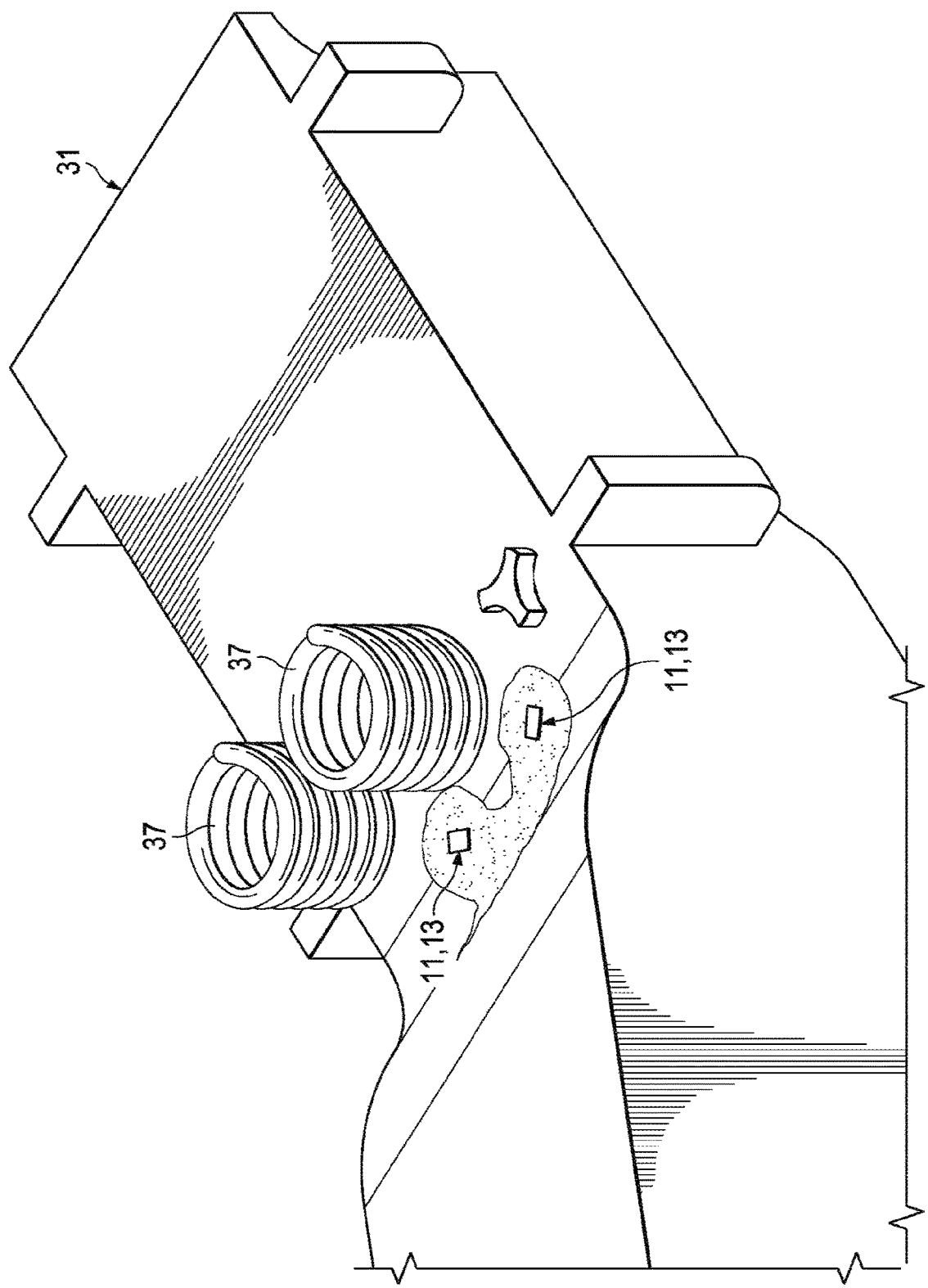
Figure 6C:
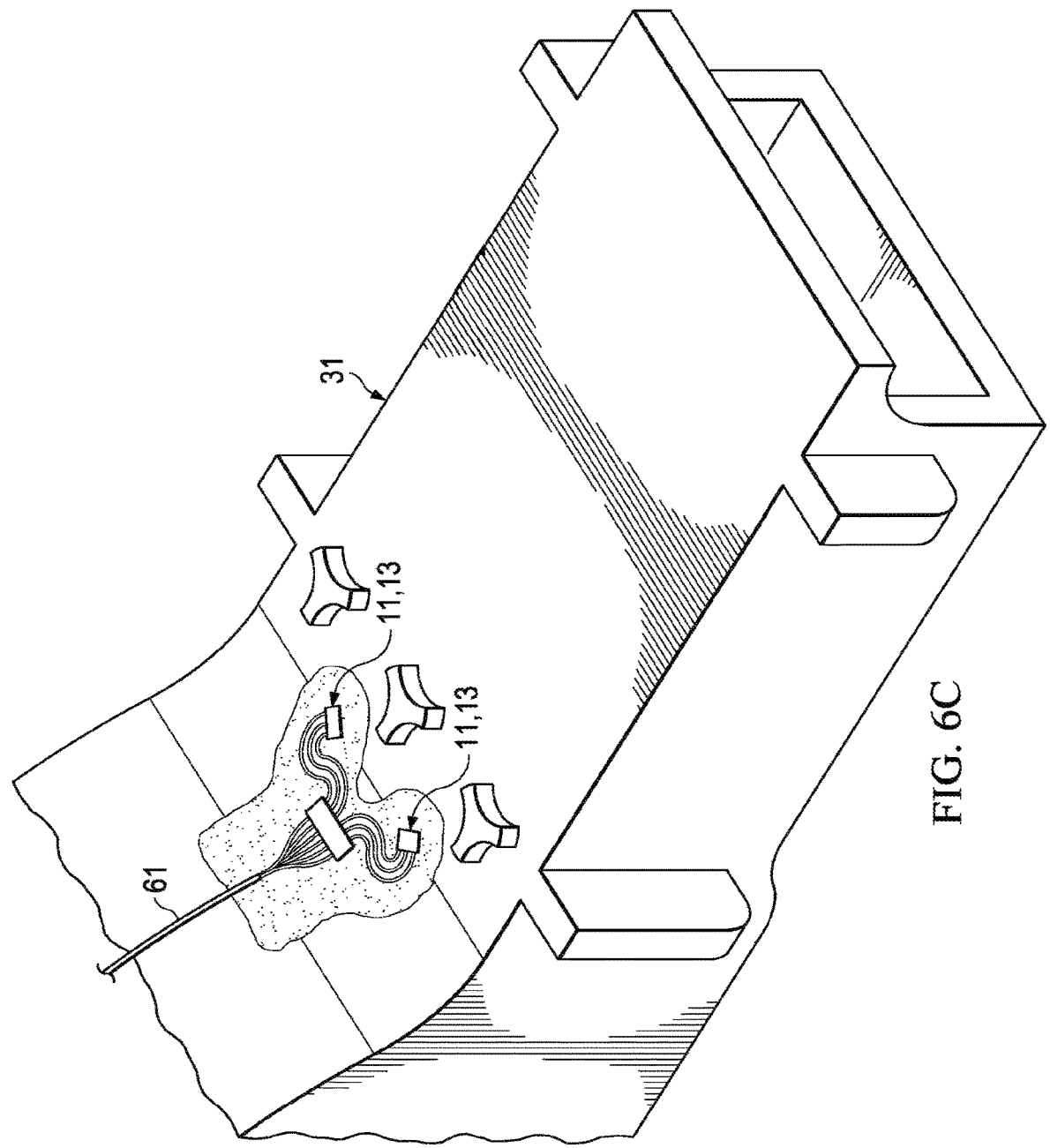
Figure 6D:
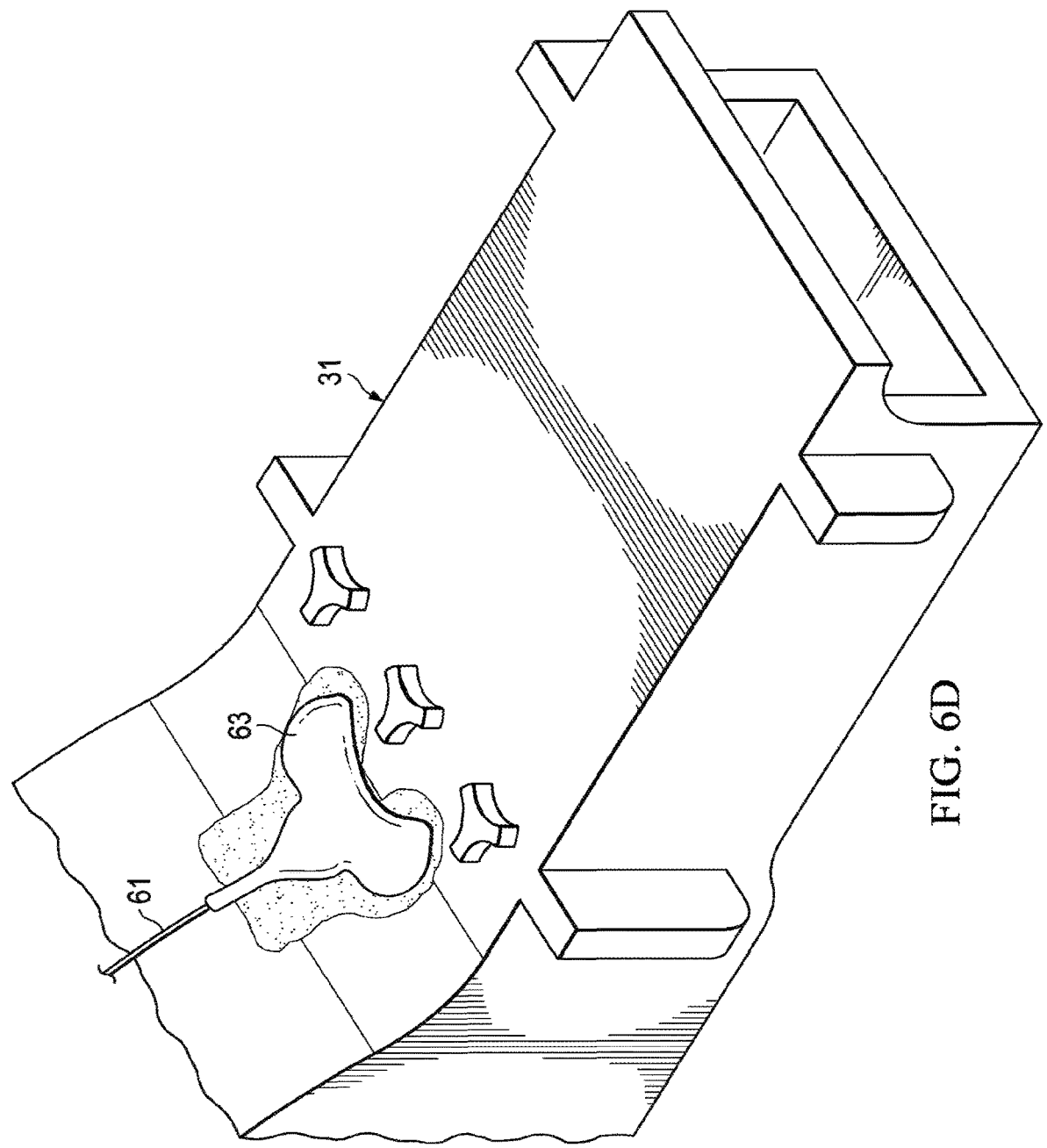
Figure 6E:
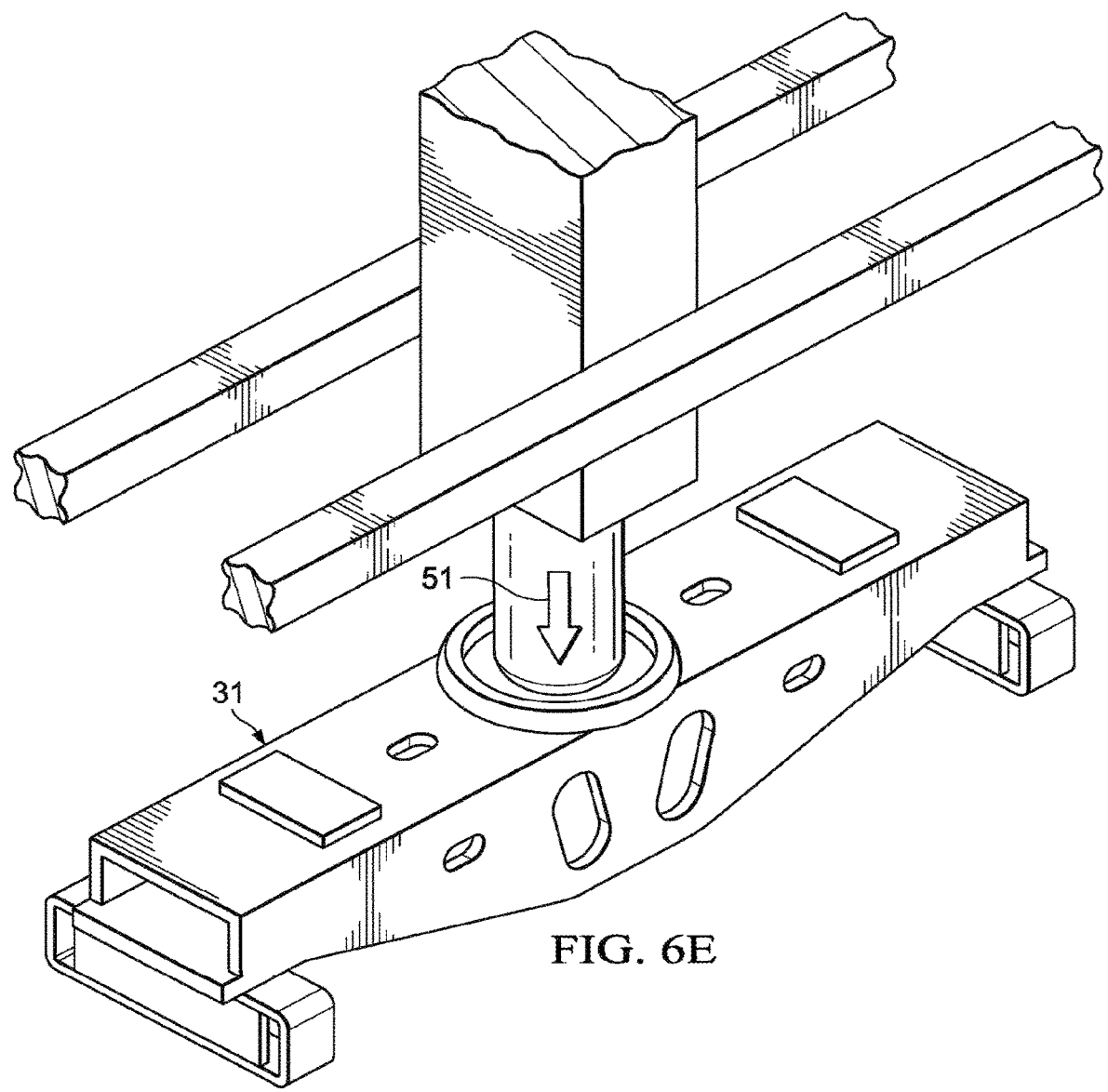

In particular, FIG. 6A illustrates preparation of a surface of the bolster 31 for the strain gauges 11, 13. FIG. 6B shows an example of the placement of the strain gauges 11, 13 adjacent the springs 37. FIG. 6C depicts the installation of the wiring 61 for the strain gauges 11, 13. FIG. 6D illustrates a form of protection 63 for the mounted strain gauges 11, 13 and wiring 61. FIG. 6E demonstrates testing of the strain gauges 11, 13 on bolster 31 while under load (e.g., simulated rail vehicle load 51) such as those presented by a railcar-mounted cryogenic tank or fuel tender containing LNG.

During testing using the test bed and test equipment, grade effects from using only one instrumented bolster were analyzed with Solidworks and a weight transfer calculation in MS Excel. The test results are depicted graphically in FIG. 7A, which shows measurement error induced by grade for a rail vehicle using only one instrumented bolster. Grades in 0.5% increments between 0% and 3% grade were compared to the shift of the LNG load when the rail car vessel is "full" (23,244 gal), about half-full or "half" (13,227 gal), and "low" (4,158 gal). The analyzed data resulted in an error for each level: (1) "Full" had an error rate of about 338 gallons per 1% grade; (2) "Half" had an error rate of about 481 gallons per 1% grade; and (3) "Low" had an error rate of about 385 gallons per 1% grade.

Figure 7A:
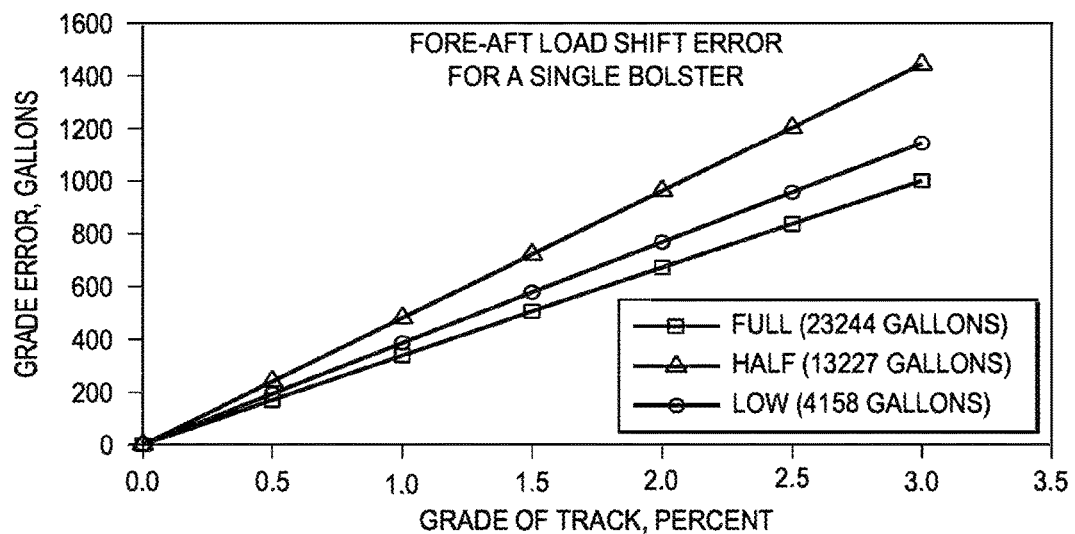
FIG. 7A is a graph depicting grade or inclination of a railroad track versus measurement error obtained by simulating the load shift of the car body and load along railroad tracks of various grades.
Figure 7B:
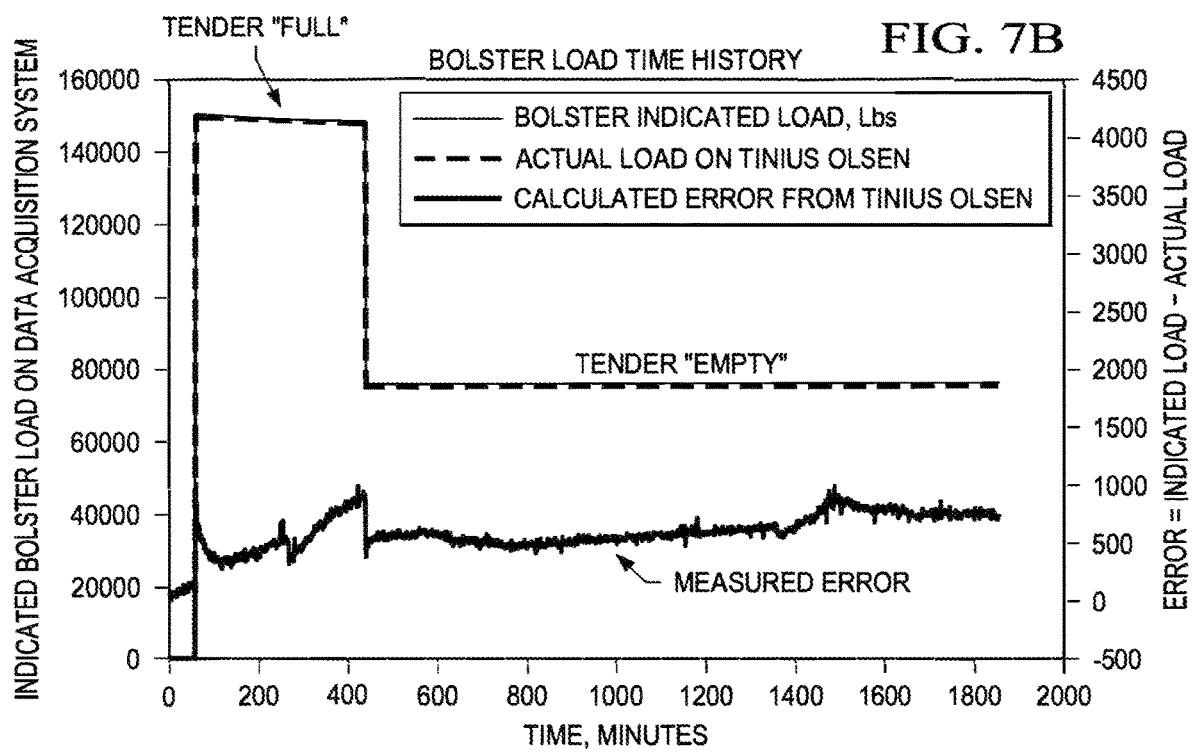
FIG. 7B is a graph depicting time versus bolster load while a generated signal is compared to a standard and an error is calculated and displayed.

The bolster was tested under different loads on a Tinius Olsen test machine. FIG. 7B shows the results, including the error with the vertical scale on the right and the bolster load (both indicated and actual) with the vertical scale on the left.

Figure 7C:
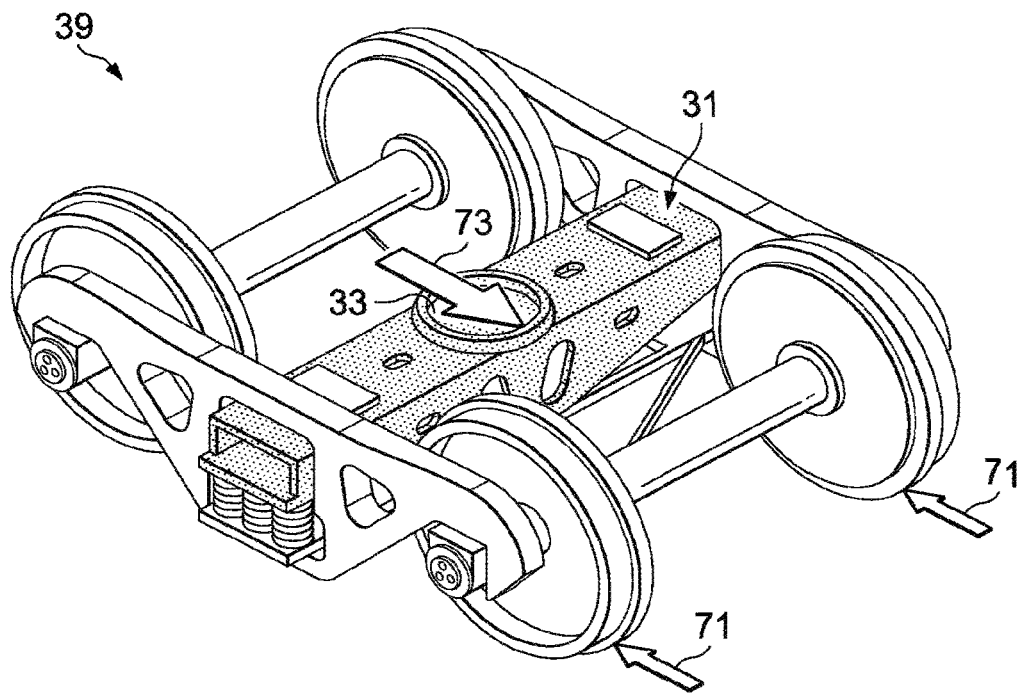
FIG. 7C is an isometric view of an embodiment of a truck for a rail car showing the expected longitudinal forces applied to the truck wheels and to the bolster during braking.

The strain gauge circuits on the bolster were wired in a "longitudinal" configuration, which uses a Wheatstone bridge circuit with both halves on a common bolster spring seat. The longitudinal configuration was expected to compensate for forces generated during train braking. FIG. 7C shows the expected braking forces at each wheel in narrower arrows 71 (two of four shown), which react through the side frame of truck 39 and contact the bolster 31 at the column plates. The railcar body force reacts against the braking force at the center bowl 33, as shown by the wider arrow 73. The forces from braking seek to bend the bolster 31 in a longitudinal direction, in a plane parallel to the track surface.

The strain gauge circuits on another bolster were wired in a "lateral" configuration, which uses a Wheatstone bridge circuit with the halves of the circuit on laterally opposed bolster spring seats. The lateral configuration was expected to compensate for forces generated during curve negotiation by the rail car.

Figure 7D:
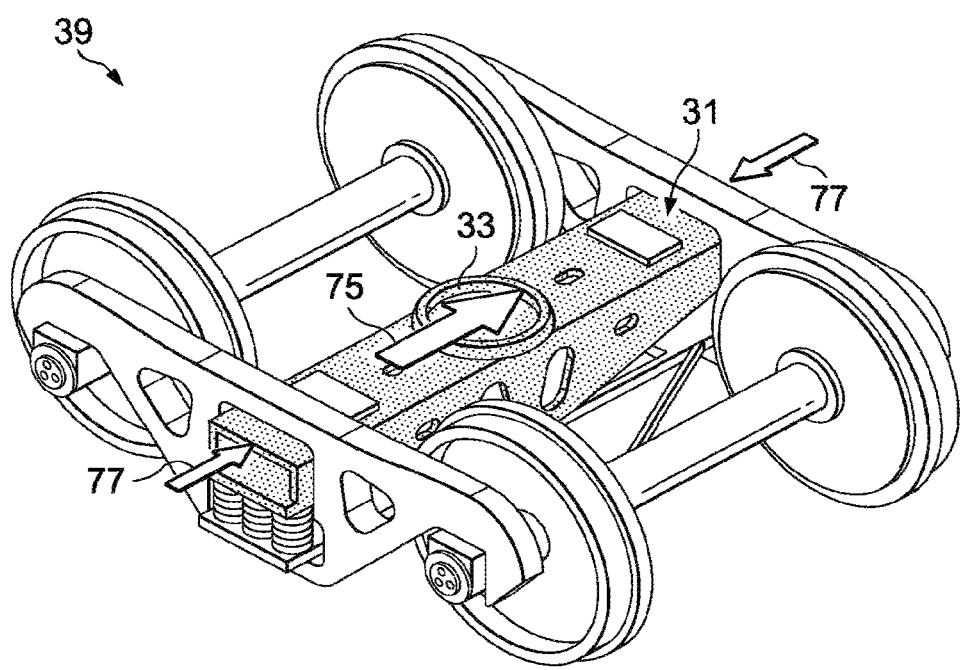
FIG. 7D is an isometric view of an embodiment of a truck for a rail car showing the expected lateral forces applied to the truck wheels and to the bolster as the rail car traverses a curved railroad track.

FIG. 7D shows the curving forces at each wheel, which are transmitted through the side frame of the truck 39 and meet the bolster 31 at the column wear plate and/or the bolster gibs. The curving forces are reacted at the center bowl 33 by the railcar body (wider arrow 75) and applied to the bolster 31 from the column wear plate and/or bolster gibs, as shown by the narrower arrows 77. The forces from curving seek to place one lateral half of the bolster in tension, and the opposite lateral half in compression.

Figure 7E:
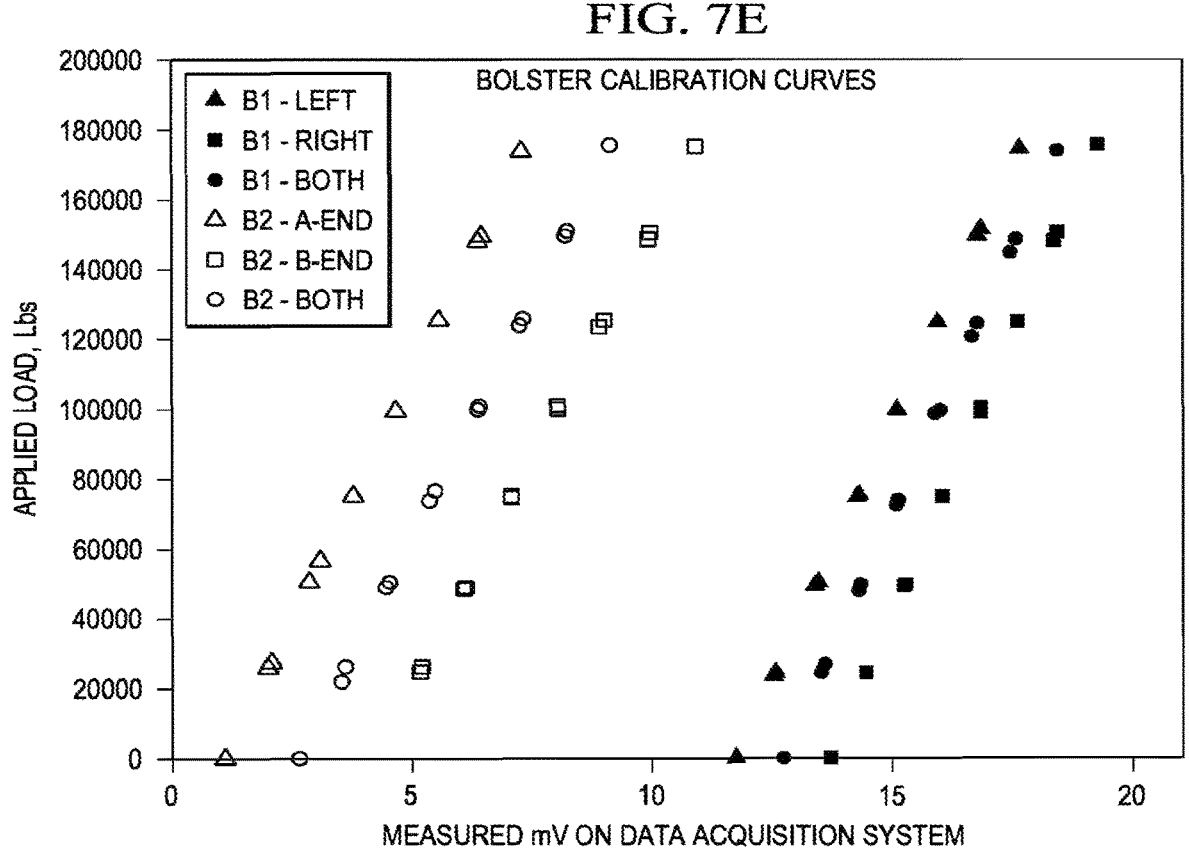
FIG. 7E is a graph of individual strain gauge bridge circuits of an embodiment of a bolster system calibration showing measured voltage versus applied load.

FIG. 7E shows the calibration curves used during testing, in which each circuit on each bolster was calibrated individually and as a group. The calibration curves are shown on the right and are generally linear, with similar slopes (gain). The gain is generally a function of gauge location. The zero-intercept (offset) may be influenced by installation methods, or stress state at the time of strain gauge installation. One advantage of the circuit wiring is an averaging effect, which is shown by the B2-Both trace. Both data points are situated midway between the B2 B-End and the B2 A-End data points on the left half of the graph. This phenomenon can be exploited to link strain gauges on all four corners of the car to compensate for load shift, both longitudinally and laterally.

The railcar can be instrumented in multiple configurations including Single Corner, Single End, and Double End. In the Single Corner configuration, one full-bridge circuit is located at one bolster spring seat of one of the bolsters and the signal is multiplied by four to obtain car weight. This configuration is susceptible to error from grade, braking forces, lateral forces, and railcar body roll motions.

In the Single End configuration, two full-bridge circuits are mounted on opposing bolster spring seats of one of the bolsters, and the signal is multiplied by two to obtain car weight. If wired in a lateral configuration, lateral forces and railcar body roll motion are compensated for. Error due to braking forces and grade remain unchanged. If wired longitudinally, the error due to braking forces is compensated for, while error due to lateral forces, grade, and railcar body motion remain unchanged.

In the Double End configuration, four full-bridge circuits are divided between the two bolsters and no signal multiplication required. All signals from each corner are averaged. If each bolster is wired laterally, lateral forces and railcar body roll motion are compensated for, while error due to braking forces remains unchanged. If each bolster is wired longitudinally, error due to braking forces is compensated for, while error due to lateral forces remains unchanged. Regardless of bolster wiring, the Double End configuration compensates for load shift from grade and from railcar body roll.

Figure 8A:
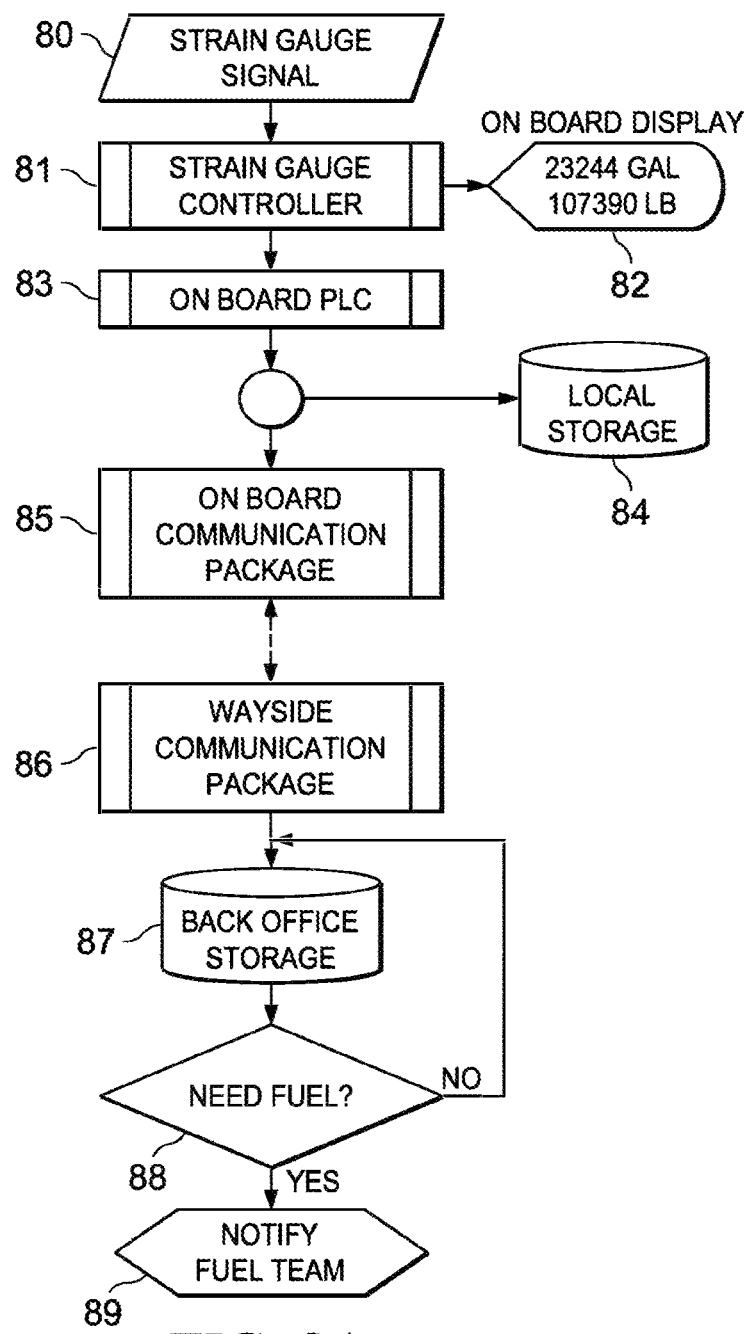
FIG. 8A shows an embodiment of a process for fuel level monitoring of a fuel tender.

As shown in the embodiment of FIG. 8A, the principles of this disclosure are useful for in-service, over-the-road fuel (such as LNG) level monitoring and reporting. For example, the strain gauge signal 80 may be sent to a controller 81, with its information displayed 82. An on-board PLC 83 can store this information 84 and/or communicate the information to an on-board communications package 85. A wayside communications package 86 can interact with the on-board communications package 85 and relay information to back office storage 87. A determination 88 is made whether fuel is needed, which can be sent to the back office storage 87 and/or a fuel team can be notified 89.

Figure 8B:
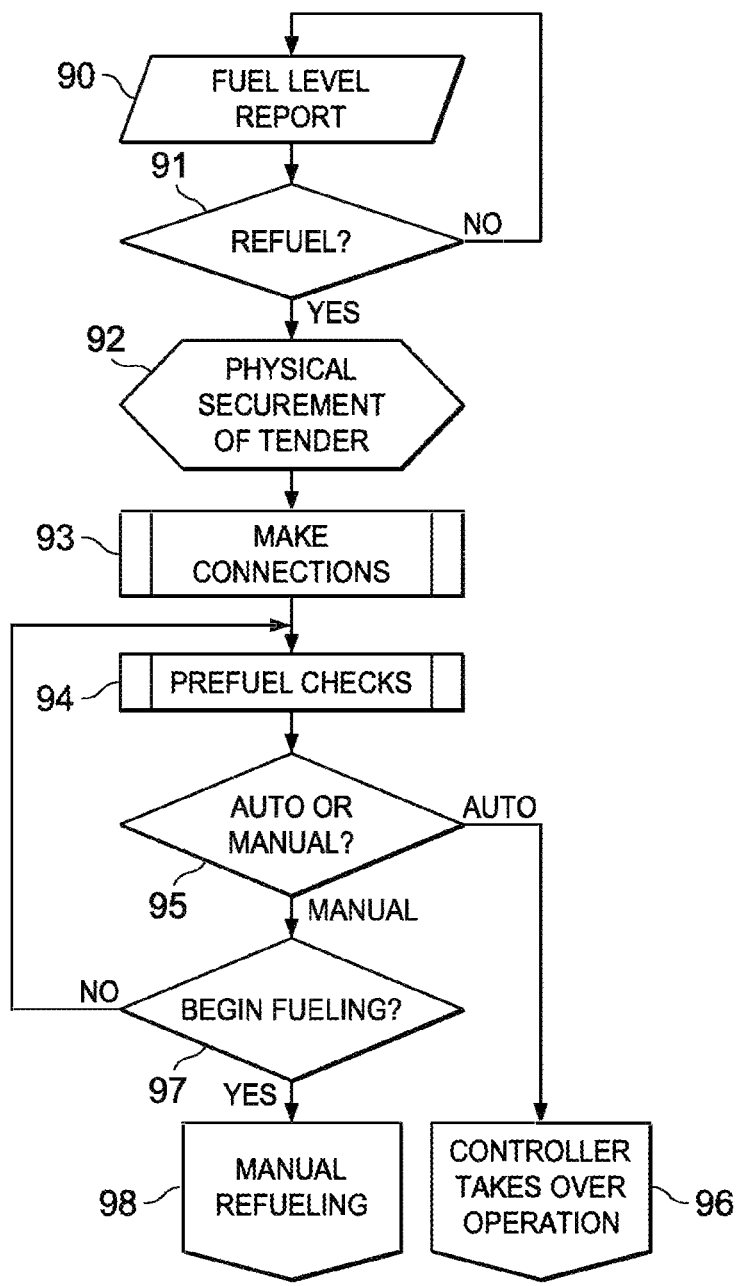
FIG. 8B shows an embodiment of a process for refueling preparation of a fuel tender.

FIG. 8B depicts an embodiment of a method of cryogenic refueling preparation. For example, after a fuel level report 90 is obtained a determination 91 is made whether refuel is needed. If not, a subsequent fuel level report is obtained. If refuel is needed, the tender is physically secured 92 and connections 93 are made. Pre-fuel checks 94 are performed and a determination 95 is made whether to refuel automatically or manually. If the refuel is automatic, the controller takes over the refuel operation 96. If the refuel is manual, an inquiry 97 is made whether to begin refueling. If not, subsequent pre-fuel checks are made. If refueling is to begin, manual refueling 98 is performed.

Figure 8C:
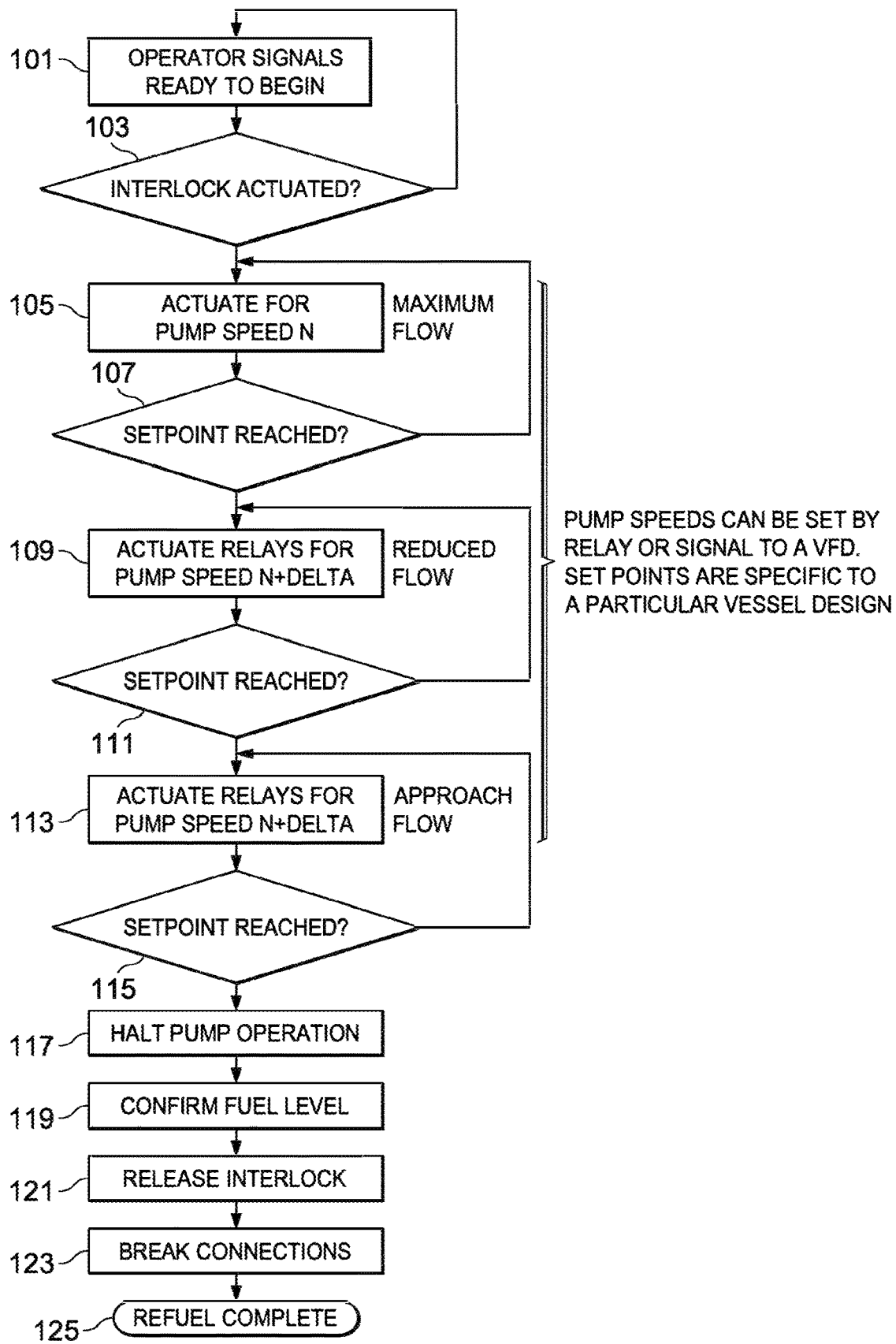
FIG. 8C shows an embodiment of a process for automatic refueling of a fuel tender.

FIG. 8C illustrates one version of automatic control of refuel equipment. For example, an operator may signal "ready to begin" 101 and a determination 103 is made whether interlock is actuated. If not, the method returns to the "ready to begin" signal 101. If so, the pump is actuated 105 for speed "n" for maximum flow rate. Pump speeds can be set by relay or signal to a variable frequency drive (VFD). Set points are specific to a particular vessel design. The method continues until the set point is reached 107, and relays are actuated 109 to change the pump speed to reduce the flow rate. Once the set point is reached 111, relays are actuated 113 to change the pump speed to an approach flow rate. Once this set point is reached 115, pump operation is halted 117, fuel level is confirmed 119, the interlock is released 121, connections are broken 125 and refueling is complete 127.

One embodiment of a load measurement system of the present principles will have at least one of the three strain gauge configurations described herein and applied to at least one of the bolsters of the car. The bolster strain gauge circuits are then connected to a controller. The strain gauges, together with a controller, recording device and a communication package comprise an integrated fuel monitoring and management system.

Embodiments of the controller may perform at least the following tasks: (1) provide power to the strain gauge circuits; (2) read the signal from the strain gauge circuits; (3) compensate the strain gauge circuit signal based on fluctuations of strain gauge circuit power; (4) display the strain gauge signal voltage or a process value (PV) based on the voltage (e.g., pounds, gallons, etc.) for observation by personnel; (5) filter the measured value based on controller configuration; (6) display alarm status based on controller configuration; (7) locally communicate the signal from the strain gauge to a recording device located on the rail car, or to a remote communications device such as a cell modem or data radio located on the rail car for transmittal to a data center; (8) control electrical relays based on the measured value; and (9) read digital input signals for alternate user input.

For error handling, should any one circuit be compromised, the controller can sense the electrical short or open circuit and display an error message. The offending circuit is connected, inspected, and diagnosed. If the circuit cannot be repaired, a calibration curve is regenerated from original calibration data excluding the offending circuit. The new calibration curve is then uploaded to the controller. The rail car may then continue to be used without the need for a bolster replacement.

Figure 9:
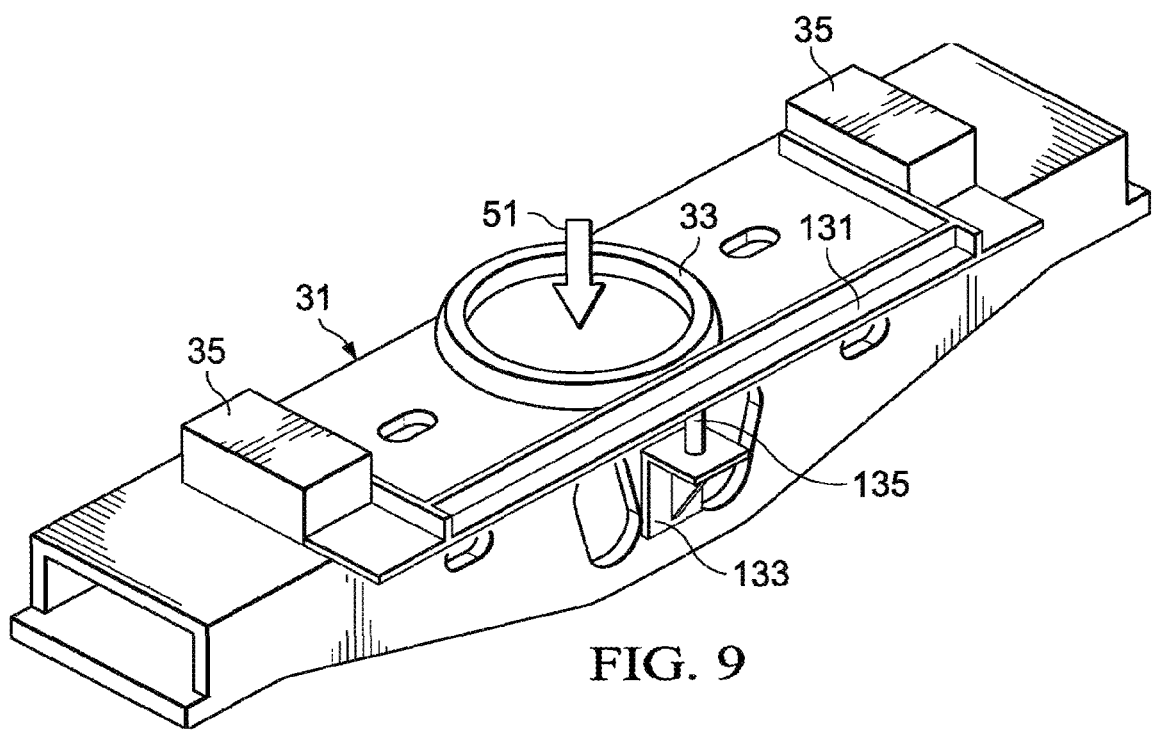
FIG. 9 is a top, front isometric view of another embodiment of a bolster for a rail car.
Figure 10:
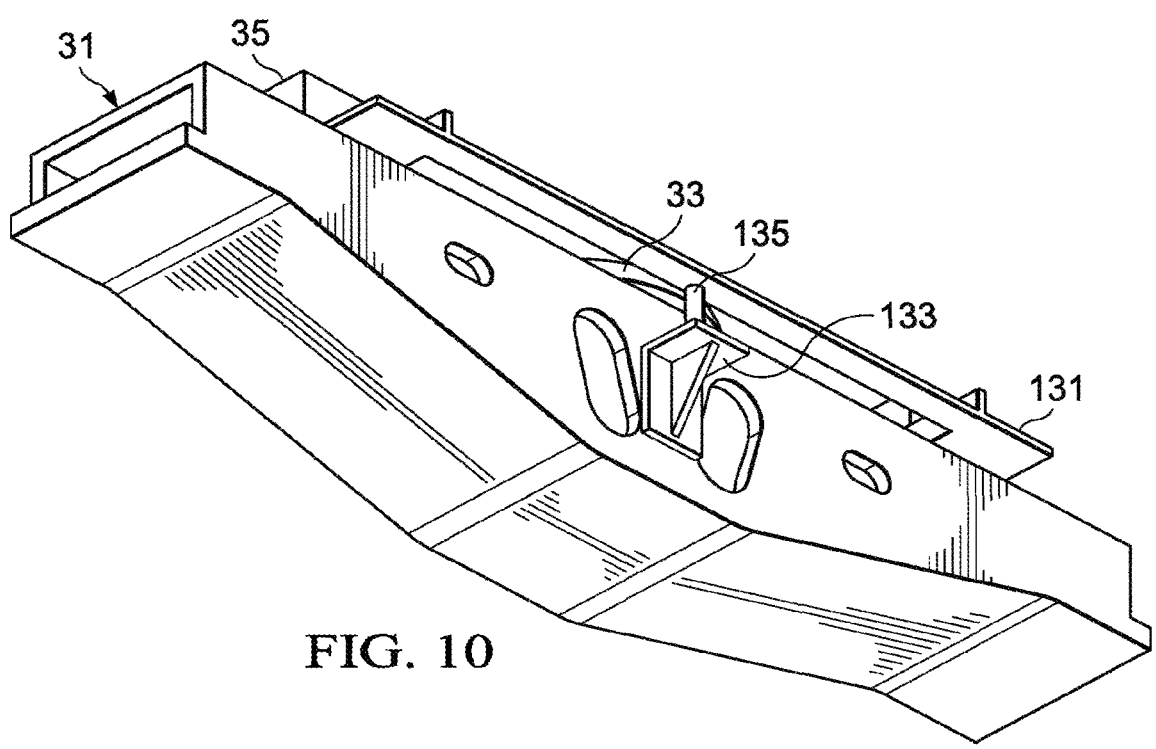
FIG. 10 is a bottom, left isometric view of the embodiment of the bolster of FIG. 9.

FIGS. 9 and 10 are isometric views of another embodiment of a bolster 31 for a rail car. In this version, measurement of vertical deflection of the bolster may be used to approximate the lading level in the storage vessel of a rail car. As noted above, a vertical load 51 (FIG. 5) to the center bowl 33 may be applied to the bolster 31 by the storage vessel. In one embodiment, a bridge 131 that is rigid is mounted to the bolster 31 adjacent lateral ends of the bolster 31. In the example shown, the lateral ends of the bridge 131 are adjacent the side bearings 35. The bridge 131 would have minimal to no vertical deflection while the bolster 31 is loaded vertically by vertical load 51. In some versions, a bracket 133 may be mounted adjacent a center vertical face of the bolster 31. Bracket 133 may be close to the center bowl and midway along the lateral length of the bridge 131. In one example, the bracket 133 is at the position of maximum deflection of the bolster 133 while it is under vertical load 51. A gauge 135, such as a displacement transducer, may be used to measure the variation in the deflection, gap or distance between the bracket 133 and the bridge 131, such as the center of the bridge 131.

In some embodiments, the bridge 131 may be secured under the side bearings 35. This configuration provides a relatively easy field installation to an existing bolster 31. In an alternate version, the bridge 131 may be made wider and bolted to the bolster 31 further laterally outboard of the side bearings 35, which could increase the measured deflection for any given load.

Figure 11:
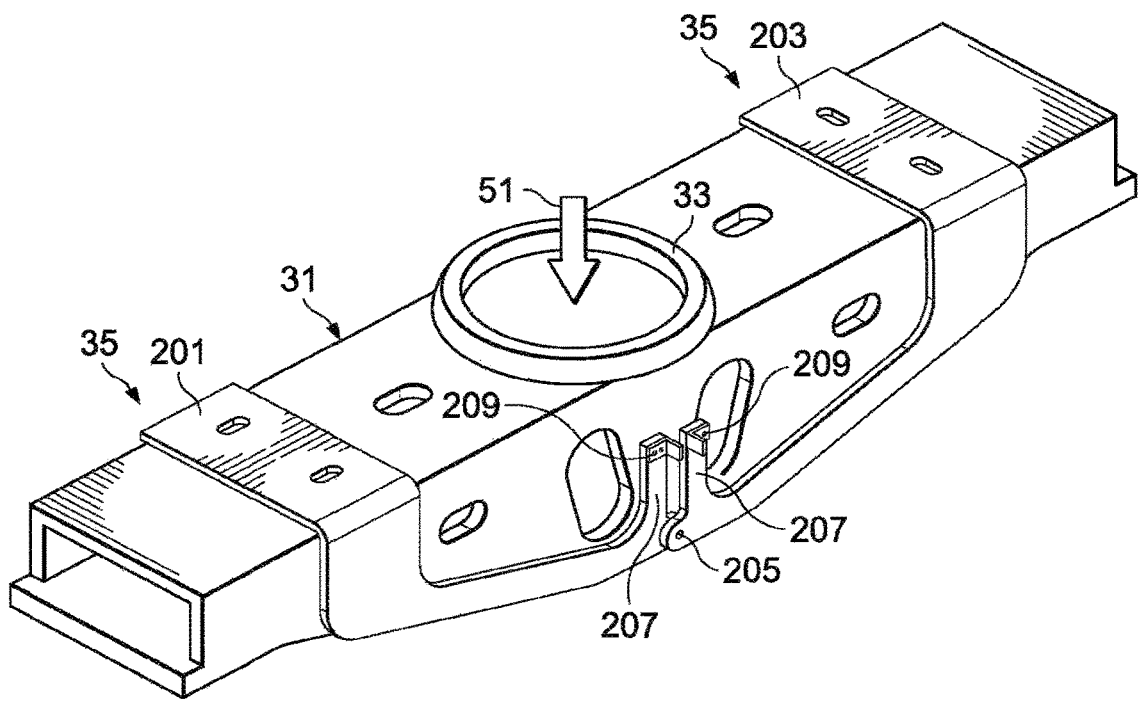
FIG. 11 is a top, front isometric view of still another embodiment of a bolster for a rail car.

FIG. 11 is an isometric view of another embodiment of a bolster 31 for a rail car. This version is somewhat similar to that of FIGS. 9 and 10, except that two mirror-image bridges 201, 203 are used. The bridges 201, 203 may be mounted to the bolster 31 beneath respective side bearings 35 on either side of the center bowl 33. The bridges 201, 203 may generally follow contours of the bolster 31, and may be joined to each other at a pivot 205. Each bridge 201, 203 may include a lever 207, such as an upward extending arm. Tips of the levers 207 may include brackets 209, which may be located adjacent a center of the bolster 31. A gauge, such as a displacement transducer, may be used to measure the variation in the deflection, gap or distance between the brackets 209. For example, when the load 51 is applied at the center bowl 33, the deflection of the bolster 31 causes a change in angular displacement of the brackets 209 relative to the pivot 205. The angular change of the bolster 31 is amplified by the levers 207, and can be observed as a linear displacement of the brackets 209 at the tips of the levers 207.

Figure 12:
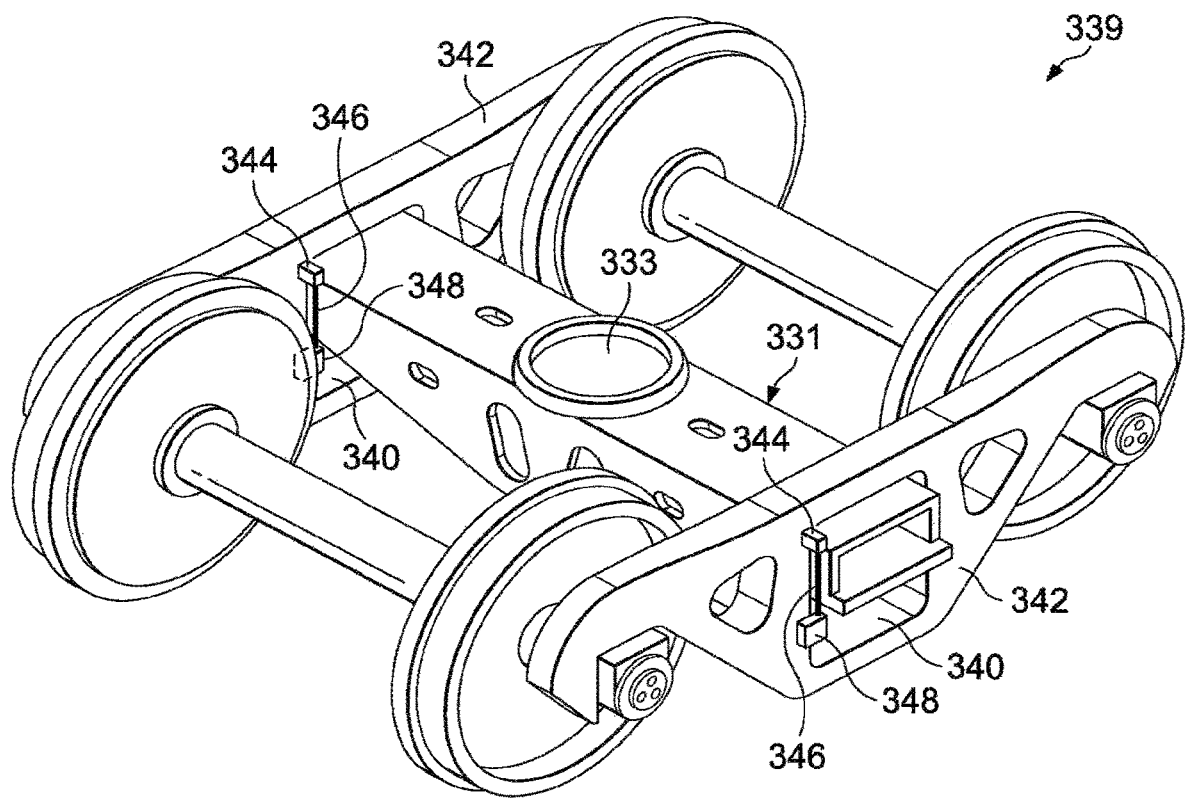
FIG. 12 is a top, front isometric view of an alternate embodiment of a bolster for a rail car.

FIG. 12 depicts an alternate embodiment of a bolster 331 on a truck 339. Truck 339 can include the same components as truck 39 (FIG. 4), including a center bowl 333, side bearings (not shown) and spring nests 340 with springs (not shown for illustration purposes) between the bolster 331 and the truck 339, and wheels mounted on axles. An embodiment of a measurement system for bolster 331 can include elements adjacent one or more side frames 342 of the truck 339. The measurement system can be positioned adjacent at least one of a leading edge or a trailing edge of the bolster 331, and either inside or outside of the side frame 342, as shown.

Embodiments of the measurement system can include a measurement device 344 that is configured to obtain a measurement of the separation of the bolster 331 and the side frame 342 via (for example) a rod 346 that can be displaced from a measurement target 348 on the side frame 342. Examples of measurement tools for such applications can include one or more of a gauge, draw-wire (e.g., string potentiometer), laser, radar, ultrasonic, linear variable differential transformer (LVDT), eddy current, or still other methods known to those of ordinary skill in the art. The measurement system and tools may be incorporated into a system, method and apparatus for lading level measurement in a railroad car, as described elsewhere herein.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

Other versions may include one or more of the following embodiments:

Embodiment 1. A railroad vehicle, comprising:
a truck having wheels configured to engage a railroad track;
a bolster supported by the truck;
a vessel supported by the bolster and configured to store a lading; and
a measurement system for measuring a level of the lading within the vessel, the measurement system comprising:
strain gauges mounted directly to the bolster and in physical, intimate contact with the bolster, wherein the strain gauges are disposed at selected points on the bolster and configured to sense at least one of lateral and longitudinal strain experienced by the bolster during motion of the railroad vehicle and generate signals in response thereto; and
a controller for calculating the level of the lading within the vessel, wherein the controller is configured to compensate for changes in the level of the lading during motion of the railroad vehicle in response to the signals generated by the strain gauges.

Embodiment 2. The railroad vehicle of any of these embodiments, wherein the strain gauges are mounted to the bolster with one of bonding or welding.

Embodiment 3. The railroad vehicle of any of these embodiments, wherein the strain gauges are not mounted to a load cell.

Embodiment 4. The railroad vehicle of any of these embodiments, wherein the railroad vehicle comprises a second truck opposite the truck, and the second truck comprises a second bolster that also has strain gauges.

Embodiment 5. The railroad vehicle of any of these embodiments, wherein the strain gauges are located only on lower surfaces of the bolster.

Embodiment 6. The railroad vehicle of any of these embodiments, wherein the strain gauges are not located on or above upper surfaces of the bolster.

Embodiment 7. The railroad vehicle of any of these embodiments, wherein the strain gauges are not located at a center bowl or at side bearings of the bolster, such that the strain gauges are not sacrificially consumed during operation of the railroad vehicle.

Embodiment 8. The railroad vehicle of any of these embodiments, wherein the strain gauges are mounted adjacent a bolster spring seat of the bolster.

Embodiment 9. The railroad vehicle of any of these embodiments, wherein the strain gauges are configured to be in one of wireless or hard-wired communication with the controller.

Embodiment 10. The railroad vehicle of any of these embodiments, wherein the strain gauges and the controller form parts of a fuel monitoring and management system, and the fuel monitoring and management system further comprises a recording device and a communications package.

Embodiment 11. The railroad vehicle of any of these embodiments, wherein the strain gauges are sealed in at least one of a metal enclosure, polytetrafluoroethylene (PTFE) tape, epoxy, rubber, nitrile rubber, sealant, room-temperature-vulcanization (RTV) sealant or silicone.

Embodiment 12. The railroad vehicle of any of these embodiments, wherein the vessel is a cryogenic tank configured to store cryogenic fuel.

Embodiment 13. The railroad vehicle of any of these embodiments, wherein the strain gauges are configured in a longitudinal configuration having portions adjacent a common bolster spring seat, such that the longitudinal configuration is configured to compensate for forces imparted to the bolster during train braking.

Embodiment 14. The railroad vehicle of any of these embodiments, wherein the strain gauges are configured in a lateral configuration having portions adjacent laterally-opposed bolster spring seats, such that the lateral configuration is configured to compensate for forces imparted to the bolster during curve negotiation by a train.

Embodiment 15. A railroad vehicle, comprising:
a pair of trucks, each having wheels configured to engage a railroad track and a bolster supported by a respective one of the trucks;
a vessel supported by the bolsters and configured to store a lading; and
a measurement system for measuring a level of the lading within the vessel, the measurement system comprising:
a gauge mounted to each of the bolsters, such that each bolster has a respective gauge, wherein the gauges are disposed at selected positions on the bolsters and configured to sense localized displacement experienced by the bolsters during motion of the railroad vehicle and generate signals in response thereto; and
a controller for calculating the level of the lading within the vessel in response to the signals generated by the gauges.

Embodiment 16. The railroad vehicle of any of these embodiments, wherein the gauges comprise one or more physical displacement gauges comprising: eddy current, capacitance, laser, confocal, inductive and magneto-inductive.

Embodiment 17. A railroad vehicle, comprising:
a truck having wheels configured to engage a railroad track;
a bolster supported by the truck;
a vessel supported by the bolster and configured to store a lading; and
a measurement system for measuring a level of the lading within the vessel, the measurement system comprising:
gauges mounted to the bolster, wherein the gauges are disposed at selected points on the bolster and are not located on or above upper surfaces of the bolster, and the gauges are configured to sense at least one of lateral and longitudinal localized displacement experienced by the bolster during motion of the railroad vehicle and generate signals in response thereto; and
a controller for calculating the level of the lading within the vessel, wherein the controller is configured to compensate for changes in the level of the lading during motion of the railroad vehicle in response to the signals generated by the gauges.

Embodiment 18. The railroad vehicle of any of these embodiments, wherein the gauges comprise one or more physical displacement gauges comprising: eddy current, capacitance, laser, confocal, inductive and magneto-inductive.

Embodiment 19. A railroad vehicle, comprising:
a pair of trucks, each having wheels configured to engage a railroad track and a bolster supported by a respective one of the trucks;
a vessel supported by the bolsters and configured to store a lading; and
a measurement system for measuring a level of the lading within the vessel, the measurement system comprising:
a gauge mounted adjacent to one of the bolsters such that the gauge is spaced apart from the one of the bolsters and configured to sense localized displacement experienced by the one of the bolsters and generate signals in response thereto; and
a controller for calculating the level of the lading within the vessel in response to the signals generated by the gauge.

Embodiment 20. The railroad vehicle of any of these embodiments, wherein the gauge is configured to sense localized vertical displacement experienced by the one of the bolsters.

Embodiment 21. The railroad vehicle of any of these embodiments, wherein the gauge comprises a physical displacement transducer that is free of direct contact with the bolster, such that gauge does not physically touch the bolster itself Embodiment 22. The railroad vehicle of any of these embodiments, further comprising a bridge mounted to a top of the bolster adjacent side bearings of the bolster, a bracket mounted to a vertical surface of the bolster, the bridge is spaced apart from the bracket, and wherein the gauge comprises a physical displacement gauge located between the bridge and the bracket.

Embodiment 23. The railroad vehicle of any of these embodiments, further comprising bridges, each mounted to a top of the bolster adjacent a respective one of the side bearings of the bolster, the bridges are attached to each other at a pivot, a lever extends from each of the bridges adjacent the pivot, and wherein the gauge comprises a physical displacement gauge located between distal tips of the levers opposite the pivot.

Embodiment 24. A method of measuring a weight of a lading in a railroad vehicle, the method comprising:

(a) providing a railroad vehicle having a pair of trucks, each truck having wheels engaging a railroad track and a bolster supported by a respective one of the trucks, and the railroad vehicle comprises a vessel supported by the bolsters and the vessel contains a lading therein;

(b) measuring a level of the lading within the vessel by sensing localized displacement of both of the bolsters during motion of the railroad vehicle and generating signals in response thereto; and (c) calculating the level of the lading within the vessel by compensating for changes in the level of the lading during motion of the railroad vehicle.

Embodiment 25. A method of installing a weight measuring system on a railroad vehicle, wherein the railroad vehicle comprises a truck having wheels configured to engage a railroad track and a bolster supported by the truck, the method comprising:

(a) grinding and polishing portions of the bolster;

(b) mounting strain gauges directly to the bolster at the ground and polished portions and installing communications hardware to the strain gauges; and then (c) sealing the strain gauges mounted to the bolster.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A railroad vehicle, comprising:
a pair of trucks, each having wheels configured to engage a railroad track and a bolster supported by a respective one of the trucks;
a vessel supported by the bolsters and configured to store a lading; and
a measurement system for measuring a level of the lading within the vessel, the measurement system comprising:
a gauge mounted to each of the bolsters, such that each bolster has a respective gauge, wherein the gauges are disposed at selected positions on the bolsters and configured to sense localized displacement experienced by the bolsters during motion of the railroad vehicle and generate signals in response thereto; and
a controller configured to:
calculate the level of the lading within the vessel in response to the signals generated by the gauges;
calculate a weight of the lading; and
compensate for changes in a level of the lading during motion of the vehicle in response to the signals generated by the gauges.

2. The railroad vehicle of claim 1, wherein the gauges comprise one or more physical displacement gauges comprising: eddy current, capacitance, laser, confocal, inductive and magneto-inductive.

3. The railroad vehicle of claim 1, wherein the gauges are mounted to the bolster with one of bonding or welding.

4. The railroad vehicle of claim 1, wherein the gauges are not mounted to a load cell.

5. The railroad vehicle of claim 1, wherein the gauges are located only on lower surfaces of the bolster.

6. The railroad vehicle of claim 1, wherein the gauges are not located on or above upper surfaces of the bolster.

7. The railroad vehicle of claim 1, wherein the gauges are not located at a center bowl or at side bearings of the bolster, such that the strain gauges are not consumed during operation of the railroad vehicle.

8. The railroad vehicle of claim 1, wherein the gauges are mounted adjacent a bolster spring seat of the bolster.

9. The railroad vehicle of claim 1, wherein the gauges are configured to be in one of wireless or hard-wired communication with the controller.

10. The railroad vehicle of claim 1, wherein the gauges and the controller form parts of a fuel monitoring and management system, and the fuel monitoring and management system further comprises a recording device and a communications package.

11. The railroad vehicle of claim 1, wherein the vessel is a cryogenic tank configured to store cryogenic fuel.

12. A railroad vehicle, comprising:
- a pair of trucks, each having wheels configured to engage a railroad track and a bolster supported by a respective one of the trucks;
- a vessel supported by the bolsters and configured to store a lading; and
- a measurement system for measuring a level of the lading within the vessel, the measurement system comprising:
- a gauge mounted adjacent to one of the bolsters such that the gauge is spaced apart from the one of the bolsters and configured to sense localized displacement experienced by the one of the bolsters and generate signals in response thereto; and
- a controller configured to:
    calculate the level of the lading within the vessel in response to the signals generated by the gauge;
    calculate a weight of the lading; and
    compensate for changes in a level of the lading during motion of the vehicle in response to the signals generated by the gauges.

13. The railroad vehicle of claim 12, wherein the gauge is configured to sense localized vertical displacement experienced by the one of the bolsters.

14. The railroad vehicle of claim 12, wherein the gauge comprises a physical displacement transducer that is free of direct contact with the bolster, such that gauge does not physically touch the bolster itself.

15. The railroad vehicle of claim 12, further comprising a bridge mounted to a top of the bolster adjacent side bearings of the bolster, a bracket mounted to a vertical surface of the bolster, the bridge is spaced apart from the bracket, and wherein the gauge comprises a physical displacement gauge located between the bridge and the bracket.

16. The railroad vehicle of claim 12, further comprising bridges, each mounted to a top of the bolster adjacent a respective one of the side bearings of the bolster, the bridges are attached to each other at a pivot, a lever extends from each of the bridges adjacent the pivot, and wherein the gauge comprises a physical displacement gauge located between distal tips of the levers opposite the pivot.

17. A method of measuring a weight of a lading in a railroad vehicle, the method comprising:
- providing a railroad vehicle having a pair of trucks, each truck having wheels engaging a railroad track and a bolster supported by a respective one of the trucks, and the railroad vehicle comprises a vessel supported by the bolsters and the vessel contains a lading therein;
- measuring a level of the lading within the vessel by sensing localized displacement of both of the bolsters during motion of the railroad vehicle and generating signals in response thereto; and
- calculating the level of the lading within the vessel by compensating for changes in the level of the lading during motion of the railroad vehicle based on a single end configuration or a double end configuration.

18. The method of claim 17, wherein the calculating is performed by a controller.

19. The method of claim 17, wherein the measuring is performed by a gauge.

* * * * *